US006595751B1

(12) United States Patent
Straub et al.

(10) Patent No.: US 6,595,751 B1
(45) Date of Patent: Jul. 22, 2003

(54) COMPOSITE ROTOR HAVING RECESSED RADIAL SPLINES FOR HIGH TORQUE APPLICATIONS

(75) Inventors: Andreas Straub, Grover Beach, CA (US); Miklos Petervary, Culver City, CA (US); William Hood, Palmdale, CA (US)

(73) Assignee: The Boeing Company, Seattle, WA (US)

( * ) Notice: Subject to any disclaimer, the term of this patent is extended or adjusted under 35 U.S.C. 154(b) by 0 days.

(21) Appl. No.: 09/590,548

(22) Filed: Jun. 8, 2000

(51) Int. Cl.[7] .............................................. F04D 29/00
(52) U.S. Cl. ................... 416/170 R; 416/244 R
(58) Field of Search .......................... 416/170 R, 244 R

(56) References Cited

U.S. PATENT DOCUMENTS

| | | | |
|---|---|---|---|
| 2,479,057 A | * | 8/1949 | Bodger ........................ 416/204 |
| 2,962,941 A | * | 12/1960 | Stein et al. ................. 416/201 |
| 3,262,675 A | | 7/1966 | Huebner, Jr. et al. |
| 3,262,676 A | | 7/1966 | Huebner, Jr. et al. |
| 3,916,495 A | * | 11/1975 | Klassen et al. ............. 416/201 |
| 4,477,227 A | * | 10/1984 | Klufas ........................ 416/201 |
| 4,720,239 A | | 1/1988 | Owczarek |
| 5,163,810 A | | 11/1992 | Smith |
| 5,205,716 A | | 4/1993 | Georges et al. |
| 5,302,081 A | | 4/1994 | Smith |
| 5,527,149 A | | 6/1996 | Moss et al. |
| 6,261,056 B1 | * | 7/2001 | Wilson ..................... 415/170.1 |

* cited by examiner

*Primary Examiner*—John Kwon
(74) *Attorney, Agent, or Firm*—Alston & Bird LLP

(57) ABSTRACT

A composite rotor is provided having a main body portion and a plurality of circumferentially spaced blades extending radially from the body portion. The rotor also includes a plurality of recessed radial splines in the body portion thereof. The splines are adapted for engaging a coupler, such as a gearwheel, and transmitting torque thereto. The amount of shear area provided by the recessed splines for transmitting torque from the rotor to the coupler is significantly increased over conventional designs because the shear area includes not only area in the inter-laminar plane, but also in the cross-laminar plane.

24 Claims, 7 Drawing Sheets

COMPOSITE ROTOR HAVING RECESSED RADIAL SPLINES FOR HIGH TORQUE APPLICATIONS

FIELD OF THE INVENTION

This invention pertains generally to composite rotors, and more particularly to composite rotors for use in high torque applications.

BACKGROUND OF THE INVENTION

Composite materials have been used for the past several decades in applications where structural elements encounter high levels of stress and/or temperature. In particular, these composite materials typically comprise fiber reinforcements and a matrix material (polymer, metal, or ceramic) that secures and condenses the fiber reinforcements. The fiber reinforcements are typically carbon fibers, but may be made of other materials, such as polymers, glass, metal, or ceramic. One such composite material is sometimes referred to as a fiber reinforced ceramic matrix composite, or FRCMC. These composites have become increasingly popular for applications where metals become structurally ineffective, such as applications involving principally high temperature environments, but also in combination with high speed rotations and high torque transmissions. In this regard, the very low density and high strength characteristics of FRCMCs at high temperatures make these composites particularly advantageous for the construction of high performance turbines. However, FRCMC components must be designed to withstand the high levels of torque associated with these types of turbines, which can require torque transmissions of over 5000 ft-lbs.

Structural elements, such as a turbine rotor, can be formed from FRCMC through machining or other processes. As stated above, FRCMC typically comprises a plurality of woven fiber plies in a two-dimensional plane. The plies are stacked on top of one another and may be attached by stitching, needling, or the like. The woven fiber plies are condensed by the ceramic matrix material using a gaseous or liquid process, such as chemical vapor infiltration.

Although the advantageous qualities of FRCMCs have been recognized for some time, early attempts at making turbine rotors using FRCMCs left much to be desired. In particular, the early designs were limited in the amount of torque that they could withstand. For example, FIG. 1 shows an early design of a FRCMC turbine rotor 100 that was successfully operational at torque levels of about 39 ft-lbs. The body portion 110 generally has a flat face surface, with radially extending blades 112 extending therefrom. A conical hub 114 protrudes away from the body portion 110, and three splines 116 are machined into the hub for engaging a coupler or gear (not shown). In operation, the turbine rotor 100 drives the coupler into rotation via the splines 116.

Although the turbine rotor 100 is structurally adequate for low torque applications, several disadvantages arise when considering high torque applications. In particular, the splines 116 are located at the inner diameter of the conical hub 114, which is where the highest centrifugal hoop stresses occur during operation for any rotating disk. In addition, the engagement of the coupler via the splines located at the inner diameter of the rotor provides the least radial leverage to carry the torque produced by the blades 112. In high torque applications, the turbine rotor of FIG. 1 would also likely have difficulties and could fail due to the high centrifugal hoop stresses and torque-induced interlaminar shear stresses that arise during such applications. Furthermore, the hub 114 that spaces the splines 116 away from the body portion 110 creates a stress concentration point 120 at the intersection of the hub with the body portion 110. The stress concentration point 120 may lead to delamination and potential loss of torque transmission in high torque applications.

Another disadvantage of the turbine rotor of FIG. 1 is that the splines 116 are shaped such that the rotor 100 has only minimal or non-existent centering capability. More specifically, various cross-sections of the rotor 100 radially expand at different portions of the rates as the temperature of the rotor increases during operation. For example, a cross-section of the rotor 100 through the portion of the hub 114 containing the splines 116 expands radially at a different rate than a solid cross-section of the rotor through the body portion 110. As a result, the differential expansion may cause the rotor 100 to become unbalanced, which can damage or destroy the rotor.

A further disadvantage of the turbine rotor of FIG. 1 is that the splines 116 are formed in a manner that could cause delamination in high torque applications. In particular, each of the splines 116 includes sidewalls that are perpendicular to the flat face surface and, more importantly, perpendicular to the composite plies that form the rotor. Each spline also includes a base surface extending between the sidewalls and parallel to the flat face surface as well as the composite plies. Similar to the stress concentration point 120 created by the intersection of the hub 114 with the body portion 110, the splines have stress concentration points at the intersection of the sidewalls with the base surface. Thus, the stress concentration points created by the splines may lead to delamination and potential loss of torque transmission in high torque applications.

Other FRCMC rotors have been designed including an unbladed disk formed of carbon/silicon carbide FRCMC with a Gleason-machined curvic coupling that was developed by Rocketdyne. In addition, NASA is developing a carbon/silicon carbide FRCMC bladed disk with biconic friction couplers for a SIMPLEX turbopump. However, these other FRCMC rotors are also designed to withstand somewhat limited torque levels, such as 140 ft-lbs. or less. As will be apparent, these FRCMC turbine rotors are therefore designed to withstand torque levels that are at least an order of magnitude less than the 5,000+ft-lbs. of torque associated with some turbines.

SUMMARY OF THE INVENTION

The rotor of the present invention has a composite construction, yet is capable of torque transmission several orders of magnitude greater than previous composite turbine rotors. The rotor of the present invention is applicable for many types of applications, but is particularly advantageous in the field of rocket propulsion. Advantageously, the rotor of the present invention includes a plurality of recessed splines located in the body portion of the rotor. The recessed splines provide more shear load area between the rotor and a mated coupler for improved torque transmission. In one particularly advantageous embodiment, recessed splines may be included on both sides of the rotor to further increase the torque carrying capability of the rotor. As a result, the rotor of the present invention is capable of a torque transmission range of about 5,500–10,000 ft-lbs., which is orders of magnitude greater than previous composite turbine rotors.

In particular, the rotor of the present invention is disk-shaped and is formed of a composite material. Preferably, the composite material is a fiber-reinforced ceramic matrix composite, or FRCMC, that is known in the art and includes several plies of woven fiber reinforcement secured by a composite matrix. Other types of composite materials may also be used, such as polymeric or metallic. The rotor includes a main body portion that typically defines a central opening for receiving a shaft. The rotor also includes a plurality of circumferentially spaced turbine blades extending radially from the body portion. To provide strength and stiffness to the turbine blades, woven plies of fiber reinforcement continuously extend from the part of the body portion adjacent the central opening to the turbine blades.

As stated above, the rotor also includes a plurality of splines in the body portion thereof. The splines are adapted for engaging a coupler, such as a gearwheel, and transmitting torque thereto. In one embodiment, the rotor includes splines on both of the opposite sides of the rotor, although in another embodiment the splines are included only on one side of the rotor. However, by including the splines on both sides of the rotor, the torque carrying capability of the rotor is increased because the applied torque generated at the turbine blades is distributed to both sides of the rotor.

Advantageously, the splines are recessed into the generally planar surface of the body portion of the rotor instead of extending outwardly as in conventional designs. In this regard, the amount of shear area provided by the recessed splines for transmitting torque from the rotor to the coupler or other device is significantly increased because the shear area includes not only area in the inter-laminar direction, but also in the cross-laminar direction. In addition, a high number of radially spaced splines are provided about the central opening of the body portion to increase the overall shear area, thus reducing the shear stresses on each spline. Typically, the splines are radially elongate so as to have a length in the radial direction that is greater than the width of the spline in the circumferential direction. In one embodiment, the radially elongate splines have a radially tapering shape, such as a wedge shape, that further increases the amount of shear area per spline.

As stated above, the splines are recessed into the body portion and extend radially from the central axis. Furthermore, the splines are optimally positioned a distance away from the central opening such that the centrifugal forces acting on the rotor are substantially balanced when the rotor is in operation. This distance, or optimum mean radius, of the splines from the central axis is the location where the plies of the rotor that are cut to form the splines least resist shear deflection with the adjacent solid plies under centrifugal loading. Each spline is generally defined by a pair of sidewalls and a base portion. Each spline also preferably defines an acute angle between each sidewall and an imaginary plane extending perpendicularly from the generally planar surface of the base portion. The acute angle allows the rotor to radially adjust and center itself relative to the coupler during operation, particularly when thermal expansion generated during operation causes various cross-sections of the rotor to expand at different rates. The rotor also does not substantially slip in the circumferential direction relative to the coupler, thus further improving the torque carrying capability of the rotor.

As stated above, the splines are recessed into the body portion of the rotor, such as by machining. In particular, the splines are recessed to a controlled depth such that the structural integrity of the woven plies extending to form the blades is maintained. In this regard, the splines are recessed into the body portion such that the base portion of each spline is, at most, adjacent the woven plies that extend radially from the part of the body portion proximate the central opening to the blades.

In one embodiment, the rotor also includes fibers that are stitched into the body portion, i.e., into and through the axial planes defined by the woven fiber plies. Preferably, the stitched fibers are perpendicular to the woven fiber plies. The added fibers add strength to the inter-laminar shear strength of the rotor, thus improving its torque carrying capability. The added fibers are stitched into the body portion from its surface to a specified depth prior to forming the splines. For rotors having splines on both sides, the added stitched fibers can be included on both sides as well.

Thus, the rotor of the present invention overcomes several shortcomings of conventional rotors. For example, the composite rotor of the present invention provides a plurality of recessed splines that enable the rotor to transmit torque orders of magnitude greater than conventional FRCMC or metallic rotors in high temperature environments. In addition, the splines are formed to radially adjust and center the rotor relative to the coupler due to thermal expansion and centrifugal growth caused during operation. The splines also are formed to avoid the stress concentration points created by sharp corners from conventional machining processes. As such, the rotor of the present invention provides a significant advancement in the art and allows a broader range of applications for FRCMC components.

BRIEF DESCRIPTION OF THE DRAWINGS

While some of the objects and advantages of the present invention have been stated, others will appear as the description proceeds when taken in conjunction with the accompanying drawings, which are not necessarily drawn to scale, wherein.

DETAILED DESCRIPTION OF THE INVENTION

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

Figure 2:
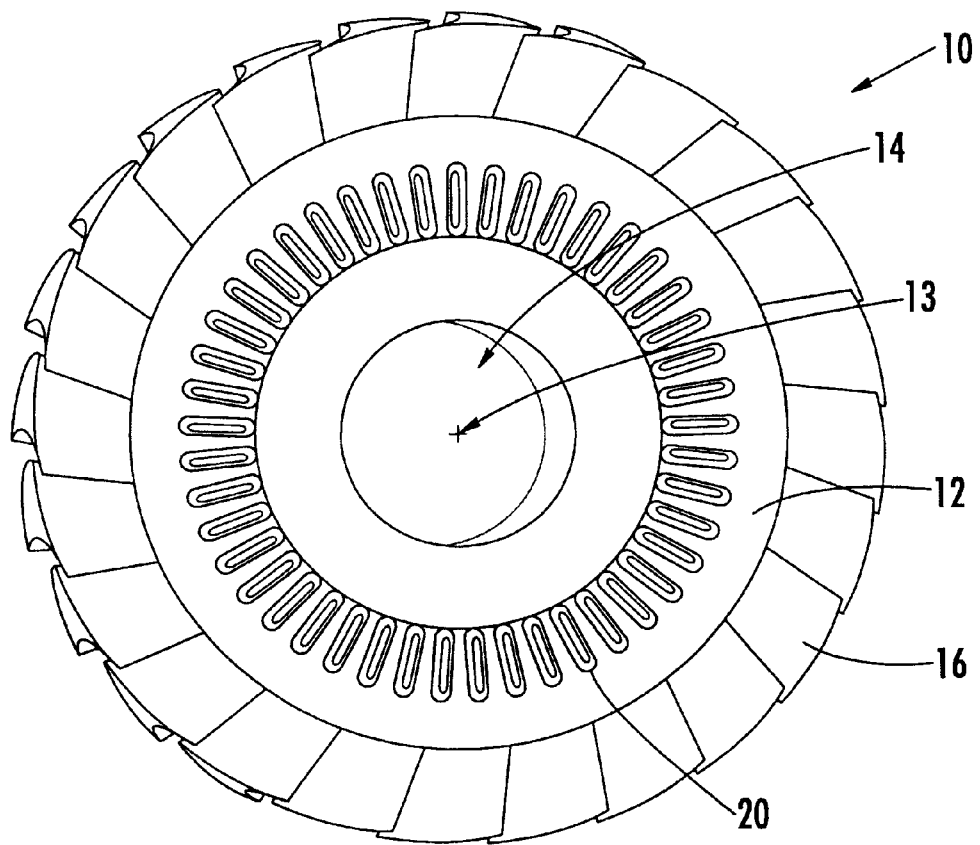
FIG. 2 is a perspective view of a rotor of one embodiment of the present invention.

Turning first to FIG. 2, a composite rotor according to the present invention is generally designated by the number 10.

The rotor 10 may be used in many applications, but is particularly advantageous for use in high temperature, high torque applications, such as in rocket engines and, more particularly, in the fuel turbopump of a reusable launch vehicle. In particular, the rotor 10 is advantageously formed of a fiber reinforced ceramic matrix composite material, or FRCMC, which provides improved rotor performance due to the low density and high strength characteristics of the materials used therein. The FRCMC is typically made from a fibrous preform comprising a series of woven fiber plies that are stacked on top of one another and condensed by a ceramic matrix. More specifically, the rotor 10 is made from a composite material having stacked carbon and/or silicon carbide fiber reinforcement plies condensed and secured by a carbon/silicon carbide composition, or a silicon carbide/silicon carbide composition. The woven fiber plies may also be linked together by needling or stitching processes. The woven fiber plies are condensed and secured by any of several known processes in the art, such as a chemical vapor infiltration process.

The rotor 10 is typically machined from the fibrous preform to its final dimensions. In particular, the rotor 10 generally has a disk-like shape and is symmetrical about the central axis 13 thereof. In one embodiment, the rotor 10 defines a central opening 14 centered about the central axis 13. As described below, a shaft or the like typically extends through the central opening and is engaged by the rotor 10. The rotor includes a body portion 12 having a generally planar surface and a series of circumferentially spaced blades 16 extending from the body portion 12 about the perimeter of the rotor. The strength of the blades 16 largely depends on the strength of the woven fibers. Thus, the woven fibers preferably extend continuously from that part of the body portion proximate the central opening 14 to form the blades 16, as discussed more fully below.

Advantageously, the rotor 10 includes a plurality of recessed splines 20 located in the body portion 12. The splines 20 are circumferentially spaced apart and are configured for engaging a coupler (not shown) and transmitting torque from the rotor 10 to the coupler. Typically, the coupler would be mounted to the shaft such that engagement of the rotor 10 and the coupler via the splines 20 also serves to couple the rotor and the shaft. In one embodiment, both sides of the rotor 10 include the recessed splines. The splines 20 are created by forming a plurality of channels into the body portion 12 using a cutting process, such as machining. In one advantageous embodiment, the rotor 10 includes 46 recessed splines on each side of the rotor about the central opening 14, although the number of recessed splines may vary according to specific design characteristics. Advantageously, the recessed nature of the splines 20 provides more torque carrying capability than conventional FRCMC rotor designs, as discussed more fully below. In addition, by providing splines on both sides of the rotor 10, additional couplings can be made to further increase the rotor's torque carrying capability by distributing the applied torque generated by the blades 16 to both sides of the rotor, instead of just one side. Accordingly, the rotor 10 of the present invention can transmit more than 5500 ft-lbs. of torque in high temperature applications, such as in rockets and gas turbines. In some applications, the rotor of the present invention may be capable of transmitting more than 10,000 ft-lbs. of torque, which is two to three orders of magnitude more than the torque transmitted by conventional FRCMC rotor designs.

Figure 1:
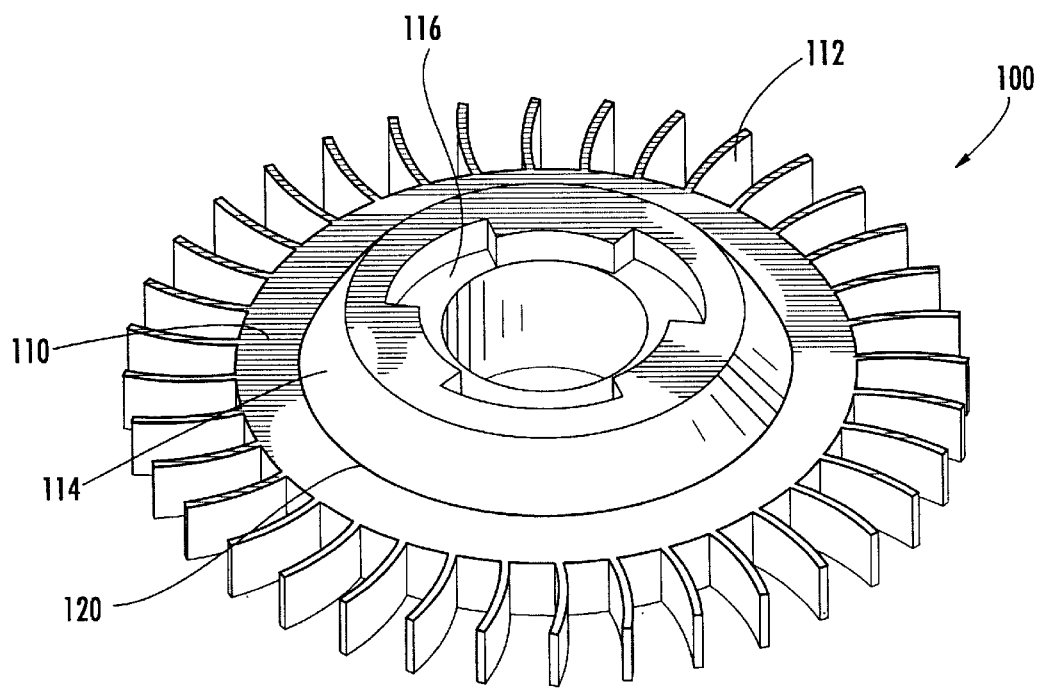
FIG. 1 is a perspective view of a prior art FRCMC rotor.

As described above, conventional FRCMC rotor designs typically include curvic or linear radial splines that protrude from the body portion of the rotor (see FIG. 1). In this regard, conventional rotors include only a limited area for shear load transmission, shown in FIG. 3 as a two-dimensional shaded area labeled 22. For protruding splines, the area 22 would be the two-dimensional planar area defined by the length of the splines and the distances between the base portions of adjacent splines.

By contrast, the rotor 10 of the present invention includes recessed splines 20. See, for example, FIG. 3 that shows a greatly enlarged view of the splines 20 according to the present invention. As shown, the splines have a generally U-like or V-like shape, defined by sides 32, 34, and base portion 35. By cutting the splines 20 into the rotor 10, the amount of shear area that assists in carrying the torque load encountered during operation is significantly increased relative to the conventional designs. More particularly, the recessed spline area of the rotor 10 includes the same shear area 22 as conventional designs plus two additional shear areas 24, 26 that also carry the torque load, thereby increasing the maximum shear load transmission characteristics of the rotor. The additional shear areas 24, 26 are polygonal in shape and are defined by the sides of adjacent splines, the distance 36 between the sides of the adjacent splines measured on the surface of the body portion 12, and the distance between the base portions 35 of the adjacent splines 20, shown in FIG. 3 as distance 30. The additional shear areas 24, 26 extend in the axial plane of the rotor 10, as opposed to the radial plane in which the shear plane 22 of conventional rotors extends. Because of the composite structure of the rotor, the additional shear areas 24, 26 are stronger than the shear area 22 of conventional spline designs despite being comparatively smaller areas, since the additional shear areas include cross-laminar shear area as opposed to the inter-laminar shear area of conventional rotors. Through testing, it has been shown that the shear strength in the cross-laminar direction is about four times greater than the shear strength in the inter-laminar direction. Accordingly, the additional shear areas 24, 26 provide significantly greater shear strength than the shear area 22 because the additional shear areas extend in the cross-laminar direction and extend through the woven fiber plies and fiber tow sections.

Figure 3:
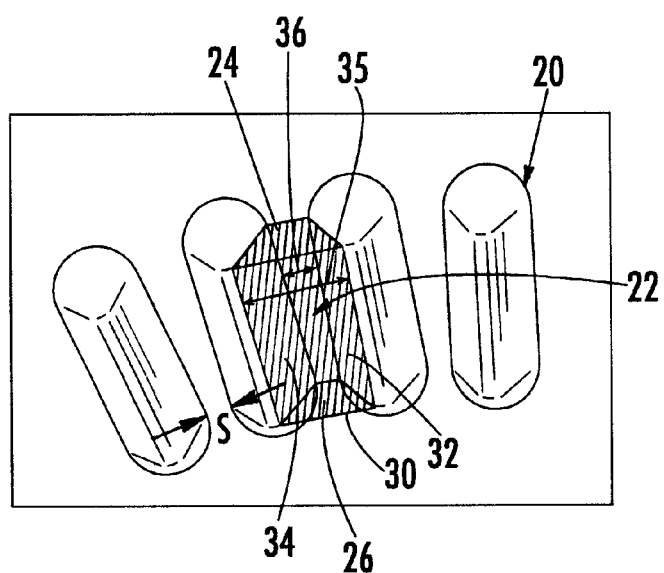
FIG. 3 is a greatly enlarged perspective view of a portion of a rotor illustrating a plurality of recessed splines according to one embodiment of the present invention.

In addition, the splines 20 are preferably machined into the body portion 12 of the rotor 10 in a radial fashion such that the distance 36 between the sides of adjacent splines measured on the surface of the body portion remains substantially constant. As a result, the splines 20 are radially wedge or pie shaped, which further increases the amount of shear area of the splines. As shown in FIG. 3, the splines are therefore generally radially elongated in that the length of each spine in a radial direction exceeds the width of each spline in a circumferential direction.

In addition, the rotor 10 is designed such that a high number of radially spaced splines are provided about the central opening 14. Thus, the relatively narrow width of each spline 20 allows for a high number of splines to be positioned about the central opening 14. By providing a high number of splines 20, such as about 46 splines for a rotor 10 having an outer diameter of about 11 inches, the local stresses on each spline are reduced because the rotor has a greater cumulative shear area. In addition, the narrow width of the splines 20 allows for ease of manufacturing because the splines can be machined to their final dimensions with a standard cutter (not shown), instead of requiring a non-standard cutter for performing an initial cutting operation and then using a standard cutter to machine the splines to their final dimensions. The maximum number of splines 20 for a particular rotor 10 is limited by a minimum composite surface width S indicated in FIG. 3. The minimum composite surface width S is set to be no smaller than one unit cell size of a particular fiber weave used in the rotor 10. For a carbon/silicon carbide polar weave, the minimum composite surface width S is about 0.090 inches. Exceeding the maximum number of splines 20 by spacing the splines below the minimum composite surface width S may compromise the strength of the fiber weave.

Figure 4:
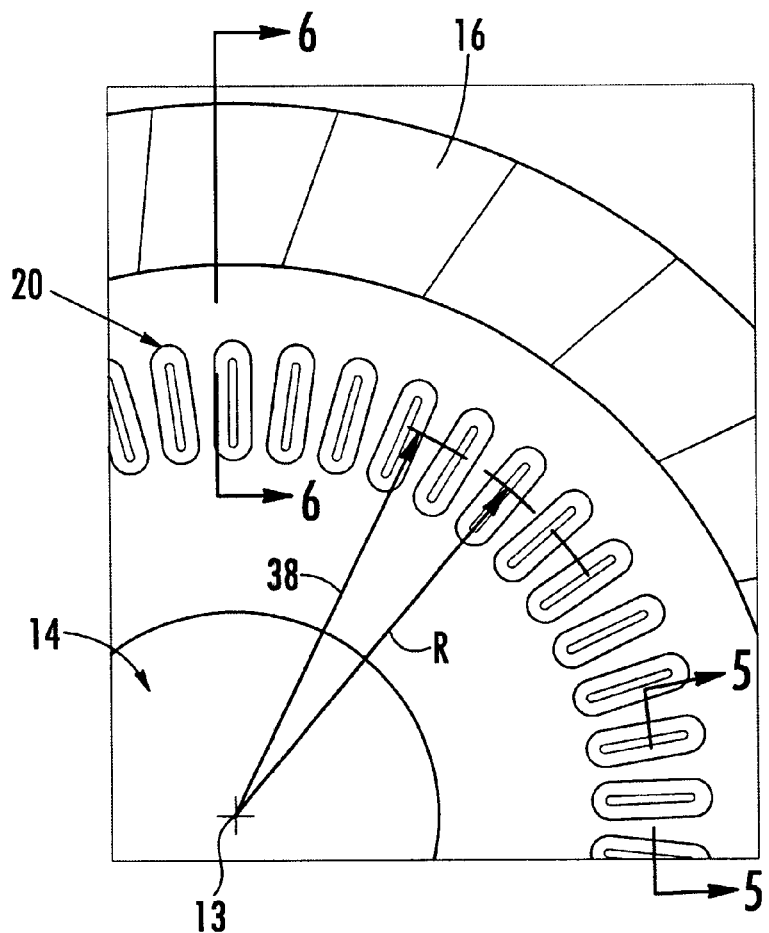
FIG. 4 is an enlarged plan view of a portion of a rotor according to one embodiment of the present invention illustrating the positioning of the recessed splines.

FIG. 4 shows an enlarged plan view of the rotor 10 according to the present invention. In particular, FIG. 4 shows an optimum mean radius R of the splines 20. The optimum mean radius R is the preferred radial distance between the average center of each spline in a radial direction, or mean radius 38, and the central axis 13. According to the present invention, the optimum mean radius R is the location where the plies of the rotor 10 that are cut to form the splines 20 least resist shear deflection with the adjacent solid plies under centrifugal loading. In other words, the optimum mean radius R positions the splines 20 such that centrifugal forces acting on the rotor 10 during operation are balanced. As such, local ply delamination is minimized when the rotor 10 rotates at high speed. The optimum mean radius R can be determined by mathematical modeling, such as finite element analysis optimization, according to the particular design characteristics of the rotor 10.

Figure 5:
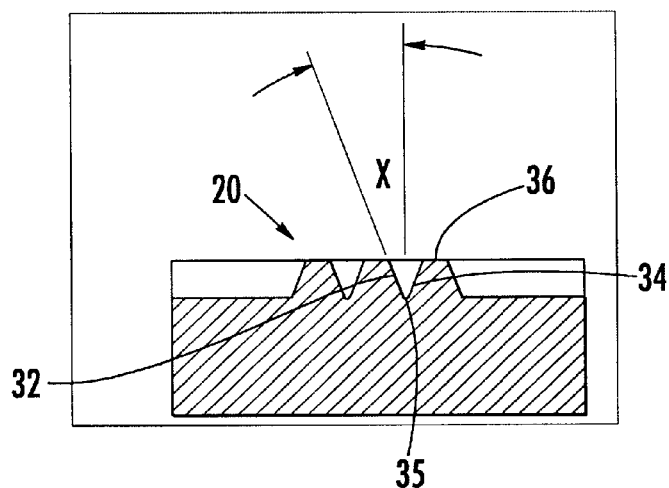
FIG. 5 is a cross-sectional view of the rotor of FIG. 4 taken along lines 5—5.

FIG. 5 shows a cross-sectional view of the splines 20 according to one embodiment of the present invention. As stated above, the splines 20 have a generally U-shape or V-shape, defined by sides 32, 34, and base portion 35. In particular, each of the sides 32, 34 define a pressure angle X between the sides and an imaginary plane extending perpendicular to the generally planar surface of the base portion. The pressure angle X can be mathematically determined according to the design characteristics of a particular rotor 10. For example, design characteristics such as local inter-laminar shear stresses, cross-ply tensile and compressive stresses, the number of splines, and the overall diameter of the rotor 10 may be considered. In one advantageous embodiment for a rotor 10 having diameter of 11 inches and 46 splines on each side of the rotor, the pressure angle X is about 24°.

Advantageously, the pressure angle X allows the rotor 10 to balance itself during operation, thus resulting in improved torque transmission. More specifically, rotors are known to thermally expand during operation, particularly due to centrifugal forces. However, portions of the rotor having different cross-sections expand at different rates. For example, a portion of the rotor having a relatively thicker portion expands at a slower rate than a portion of the rotor that is thinner. In this regard, differing thermal expansion rates can cause the rotor to misalign from the mated coupler and result in lower torque transmission. The present invention seeks to circumvent this problem by providing splines 20 defining pressure angles X, which center the rotor 10 during operation while providing uniform radial adjustment against the coupler under thermal expansion.

Figure 6:
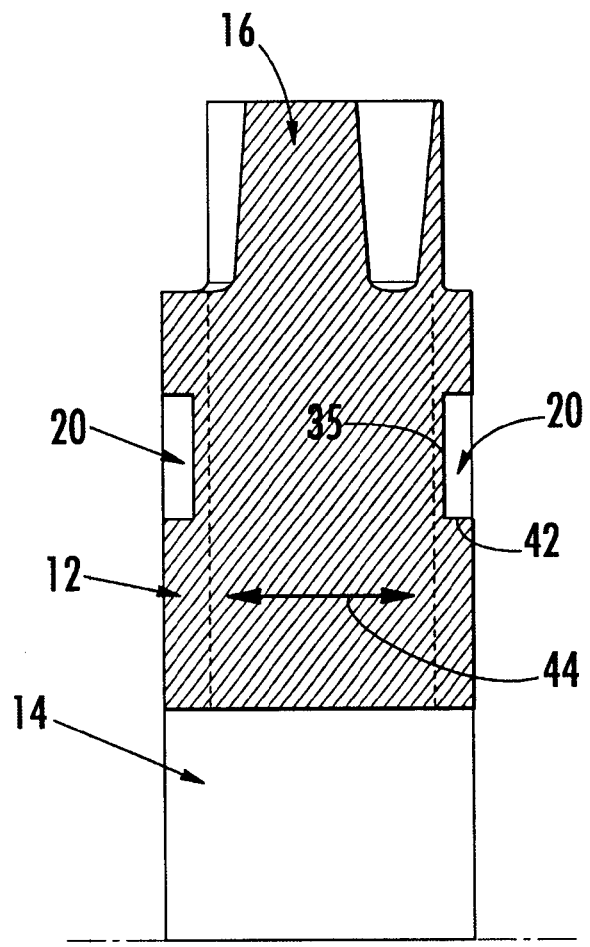
FIG. 6 is a cross-sectional view of the rotor of FIG. 4 taken along lines 6—6.

FIG. 6 shows a cross-sectional view of one embodiment of the rotor 10 illustrating the positioning of the splines 20 relative to the blades 16. More specifically, the splines 20 are recessed to a fixed depth in order to maintain strength and stiffness in the rotor 10. As stated above, the rotor 10 is formed from the woven fiber plies and ceramic matrix composite preform. In this regard, the rotor 10 includes woven fiber plies that extend continuously from the part of the body portion proximate the central opening 14 to the blades 16. In operation, the blades 16 depend primarily on the woven fibers of the plies for strength and stiffness. Thus, the splines 20 extend into the body portion 12 such that the base of each spline is, at most, at a maximum depth 42, wherein the base is adjacent the plies 44 that extend outwardly to form the blades 16. In one embodiment, the depth 42 of the splines 20 is about 0.2 inches. In other words, the blades generally are contiguous with a medial portion of the body portion that is spaced from the surface of the body portion by a predetermined distance. As such, the depth of each spline is preferably less than the predetermined distance so as not to disrupt the plies that extend through the body portion to form the blades. By not affecting the plies 44 that form the blades, the structural integrity of the blades 16 is maintained during operation. Thus, the splines can extend a distance into the body portion 12 such that torque transmission is maximized for the rotor 10, yet not extend into the body portion a distance such that the structural integrity of the plies 44 that form the blades 16 is compromised.

Furthermore, the depth 42 is at least partially determined by the radial positioning of the splines 20, discussed above in conjunction with the mean radius 38 and optimum mean radius R. For example, as the mean radius 38 increases and the splines 20 are located closer to the blades 16, the depth 42 of the splines should decrease accordingly because the torque requirements decrease as the mean radius increases. In addition, the local stresses acting on the splines 20 should be reduced as the mean radius R increases in order to preserve the structural integrity of the blades. On the other hand, the depth 42 becomes less critical as the mean radius 38 decreases and the splines 20 approach the central opening 14 because the blades 16 are located a greater distance from the splines 20. Preferably, however, the splines are radially spaced from the central opening 14 and, most commonly, are located nearer to the blades 16 than the central opening.

Figure 7:
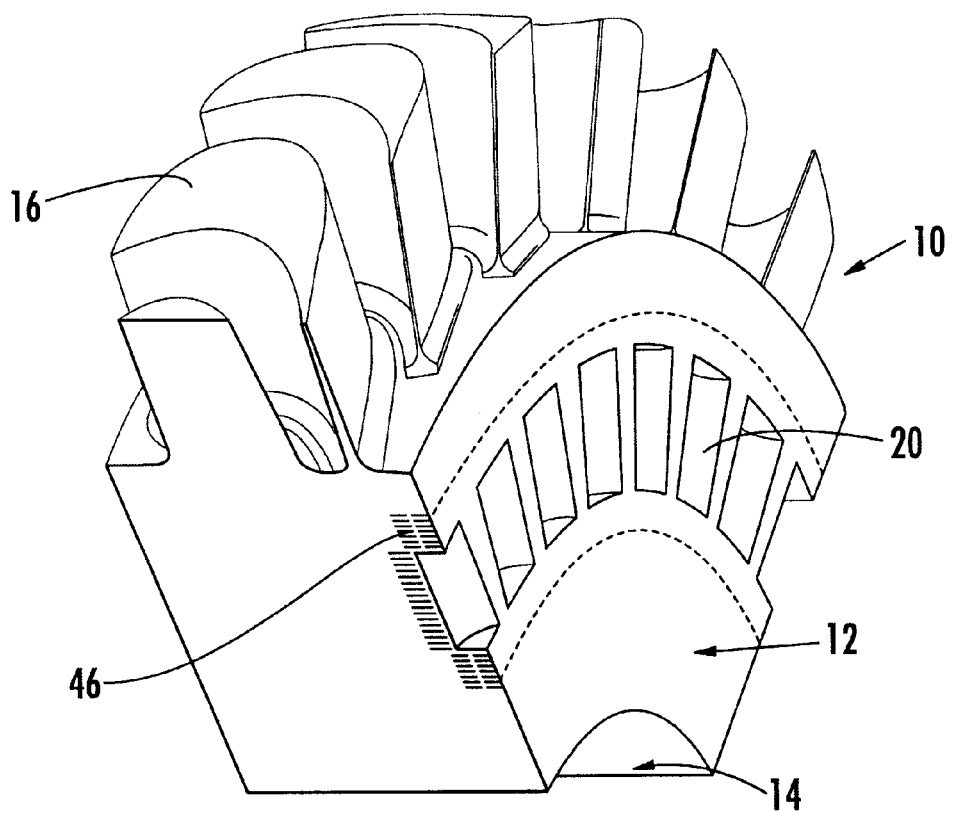
FIG. 7 is a partial perspective view of a rotor showing stitched inter-laminar fibers according to one embodiment of the present invention.

FIG. 7 shows a partial cross-section and perspective view of the rotor 10 according to one embodiment of the present invention. In particular, additional fibers 46 are shown generally embedded in that part of the body portion surrounding the splines 20. The additional fibers 46 are stitched into the body portion 12 perpendicular to the woven plies forming the rotor 10. Advantageously, the additional fibers 46 add significant inter-laminar shear strength to the rotor 10. In one embodiment, the inter-laminar shear strength is increased by a factor of two to three. The additional fibers 46 are stitched into the body portion 12 to a predefined depth that is preferably greater than the depth of the splines that are subsequently formed. In one embodiment, the additional fibers 46 account for about 2–7% of the total fiber volume present in the rotor 10. As a result, the splines 20 can carry greater loads, thereby raising the overall torque carrying capability of the rotor 10 accordingly. Although not shown in FIG. 7, the additional fibers 46 can be located on both sides of the rotor 10 if splines 20 are present on both sides as well.

Thus, the rotor 10 of the present invention allows for torque transmission orders of magnitude greater than conventional composite rotors. In this regard, the plurality of splines 20 are formed to maximize torque transmission by incorporating shear transmission areas in the inter-laminar and cross-laminar directions. In addition, the splines are formed such that the plies 44 extending to form the blades 16 are not compromised, which provides strength to the rotor 10. Furthermore, the splines 20 are formed to radially adjust and center the rotor 10 due to thermal expansion caused during operation. These and other benefits are provided by the rotor 10 of the present invention, which represents a significant advancement in the art and allows a broader range of applications for composite rotors.

Many modifications and other embodiments of the invention will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A disk-shaped, composite rotor, comprising:
   a body portion having a generally planar surface, said body portion defining a central opening therethrough;
   a plurality of circumferentially spaced blades extending from the generally planar surface of said body portion; and
   a plurality of discrete recessed splines extending into the generally planar surface of said body portion and positioned a predetermined radial distance away from the central opening, said discrete recessed splines having radially tapering side edges and curved endwalls adapted for engaging a coupler and transmitting torque thereto, wherein said body portion and said blades comprise a fiber reinforced composite matrix material selected from the group consisting of polymeric and ceramic.

2. A composite rotor according to claim 1, wherein the fiber reinforced composite matrix material comprises a plurality of fibers woven into plies having a predetermined unit cell size, and wherein adjacent splines are spaced apart by a separation distance that is at least as large as the predetermined unit cell size.

3. A composite rotor according to claim 1, wherein said predetermined radial distance of said splines from the central opening is greater than a radial distance measured between said splines and said blades are located nearer to said blades than the central opening defined by said body portion.

4. A disk-shaped, composite rotor, comprising:
   a body portion having a generally planar first surface;
   a plurality of circumferentially spaced blades extending from said body portion; and
   a plurality of discrete recessed splines extending into the generally planar first surface of said body portion, said recessed splines adapted for engaging a coupler and transmitting torque thereto, wherein each of said splines defines first and second sidewalls, curved endwalls, and a base portion extending therebetween, said first and second sidewalls each being positioned at an acute angle relative to an imaginary plane extending perpendicular to the generally planar surface of said body portion such that said splines act to radially center the rotor about the coupler.

5. A composite rotor according to claim 4, wherein said acute angle of said first and second sidewalls is defined such that said splines act to provide uniform radial adjustment of said coupler.

6. A composite rotor according to claim 4, wherein said acute angle is about 24°.

7. A disk-shaped, composite rotor, comprising:
   a body portion having a generally planar first surface, said body portion defining a central opening therethrough;
   a plurality of circumferentially spaced blades extending from said body portion;
   a plurality of discrete recessed splines extending into the generally planar first surface of said body portion and positioned a predetermined radial distance away from the central opening, said discrete recessed splines having radially tapering side edges and curved endwalls adapted for engaging a coupler and transmitting torque thereto; and
   reinforcing fibers extending through a portion of said body portion proximate said splines.

8. A disk-shaped, composite rotor, comprising:
   a body portion having a generally planar first surface, said body portion defining a central opening therethrough;
   a plurality of circumferentially spaced blades extending from said body portion; and
   a plurality of discrete recessed splines extending into the generally planar first surface of said body portion and positioned a predetermined radial distance away from the central opening, said discrete recessed splines having radially tapering side edges and curved endwalls adapted for engaging a coupler and transmitting torque thereto, wherein said body portion further comprises a generally planar second surface opposite the generally planar first surface, and wherein the composite rotor further comprises a plurality of discrete recessed splines having radially tapering sides edges and curved endwalls extending into the generally planar second surface of said body portion for engaging the coupler and transmitting torque thereto.

9. A disk-shaped, composite rotor, comprising:
   a generally planar body portion having opposing sides;
   a plurality of circumferentially spaced blades extending from said body portion; and
   a plurality of discrete recessed splines having curved endwalls extending into said body portion for engaging a coupler and transmitting torque thereto, wherein each spline has a length in a radial direction and a width in a circumferential direction that is less than the length, and wherein each spline is tapered such that the width of each spline increases in a radially outward direction.

10. A composite rotor according to claim 9, wherein said body portion and said blades comprise a fiber reinforced composite matrix material selected from the group consisting of polymeric, metallic, and ceramic.

11. A composite rotor according to claim 10, wherein the fiber reinforced composite matrix material comprises a plurality of fibers woven into plies having a predetermined unit cell size, and wherein adjacent splines are spaced apart by a separation distance that is at least as large as the predetermined unit cell size.

12. A composite rotor according to claim 9, wherein said body portion defines a central opening through which a shaft extends, and wherein said discrete splines are positioned a predetermined radial distance away radially spaced from the central opening.

13. A composite rotor according to claim 12, wherein said predetermined radial distance of said splines from the central opening is greater than a radial distance measured between said splines and said blades are located nearer to said blades than the central opening defined by said body portion.

14. A composite rotor according to claim 9, wherein said splines have a first side edge and a second side edge that radially taper to define an acute angle therebetween.

15. A composite rotor according to claim 14, wherein said first side edge of one spline is substantially parallel to said second side edge of an adjacent spline.

16. A composite rotor according to claim 9, wherein said discrete splines include radially tapering side edges and curved endwalls that define shear load transmission areas in both an inter-laminar direction and a cross-laminar direction.

17. A composite rotor according to claim 9, wherein said discrete splines have a mean radius from a central axis such that said splines substantially balance centrifugal forces on the coupler said body portion are substantially balanced.

18. A composite rotor according to claim 9, wherein each of said discrete splines defines first and second sidewalls, curved endwalls, and a base portion extending therebetween, said first and second sidewalls each being positioned at an acute angle relative to an imaginary plane extending perpendicular to the generally planar surface of said body portion such that said splines act to radially center the rotor about the coupler.

19. A composite rotor according to claim 18, wherein said acute angle of said first and second sidewalls is defined such that said splines act to provide uniform radial adjustment of said coupler.

20. A composite rotor according to claim 18, wherein said acute angle is about 24°.

21. A composite turbine rotor according to claim 9, further comprising reinforcing fibers extending through a portion of said body portion proximate said splines.

22. A composite rotor according to claim 9, wherein each spline has a length in a radial direction and a width in a circumferential direction, and wherein the length of each spline is greater than the width of the respective spline.

23. A composite rotor according to claim 9, wherein said body portion further comprises a generally planar second surface opposite the generally planar first surface, and wherein the composite rotor further comprises a plurality of recessed splines extending into each opposing side of the generally planar second surface of said body portion for engaging the coupler and transmitting torque thereto.

24. A composite rotor according to claim 9, wherein the rotor is formed of a plurality of composite plies, the plurality of plies including medial plies and surface plies, said medial plies being a predetermined distance axially inward of said surface plies, said blades being contiguous with at least one medial ply, and wherein each spline extends into at least one of said opposing sides of said body portion to a depth less than the predetermined distance between said surface plies and said medial plies.

* * * * *

UNITED STATES PATENT AND TRADEMARK OFFICE
CERTIFICATE OF CORRECTION

PATENT NO.    : 6,595,751 B1  
DATED         : July 22, 2003  
INVENTOR(S)   : Straub et al.

It is certified that error appears in the above-identified patent and that said Letters Patent is hereby corrected as shown below:

Column 1,  
Line 4, following the title, insert the following:  
-- GOVERNMENTAL RIGHTS  
The United States Government may have rights in the present application through NASA cooperative agreement NCCB-155 (96-ROC-001). --

Column 9,  
Lines 41-43, cancel "are located nearer to said blades than the central opening defined by said body portion";  
Lines 45, 49 and 66, cancel "first".

Column 10,  
Lines 4, 13, 18 and 25, cancel "first";  
Line 27, "sides" should read -- side --;  
Line 54, cancel "radially spaced";  
Lines 59-61, cancel "are located nearer to said blades than the central opening defined by said body portion".

Column 11,  
Line 9, cancel "said body portion are substantially balanced".

Column 12,  
Lines 8-10, cancel "wherein said body portion further comprises a generally planar second surface opposite the generally planar first surface, and";  
Line 13, cancel "second suface of said".

Signed and Sealed this

Fourteenth Day of October, 2003

JAMES E. ROGAN  
*Director of the United States Patent and Trademark Office*